Patented May 25, 1943

2,319,798

UNITED STATES PATENT OFFICE 2,319,798

INTERPOLYMERS OF AN UNSATURATED ALKYD RESIN AND A POLY-(HALOGENO-ALLYL) ESTER

Gaetano F. D'Alelio, Pittsfield, Mass., assignor to General Electric Company, a corporation of New York No Drawing. Application October 31, 1939, Serial No. 302,171

15 Claims. (Cl. 260—42)

This invention relates to the production of new materials having valuable and characteristic properties that make them especially suitable for use in industry, for example in molding, laminating, casting, coating and adhesive applications, and for other purposes. The invention is concerned more particularly with compositions of matter comprising an interpolymer (copolymer) or interpolymers of at least one modified or unmodified polyhydric alcohol ester of an alpha unsaturated alpha beta polycarboxylic acid (hereafter for brevity designated generally as an "unsaturated alkyd resin") and at least one poly-(halogenoallyl) ester selected from the class consisting of poly-(1-halogenoallyl) and poly-(2-halogenoallyl) esters of a non-ethylenic polycarboxylic acid such, for instance, as saturated aliphatic (including cyclo-aliphatic) and aromatic polycarboxylic acids.

The poly-(1-halogenoallyl) and poly-(2-halogenoallyl) esters of non-ethylenic polycarboxylic acids used in carrying the present invention into effect may be considered as being allyl esters having the graphic formulas

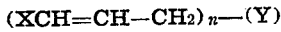

and

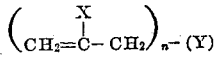

respectively, where $n$ has a numerical value of at least 2, X is a halogen and Y is a radical of a non-ethylenic polycarboxylic acid (or anhydride thereof if available) containing at least two esterifiable carboxy groups. From the above formulas it will be seen that polyesters, the alcohol radicals of which contain the grouping, XCH=CH—CH$_2$—, or the grouping,

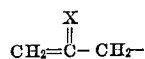

are embraced by this invention. The term "poly-(halogenoallyl) ester of a non-ethylenic polycarboxylic acid," as used generally herein, is intended to include within its meaning esterification products of a non-ethylenic polycarboxylic acid, or an anhydride thereof if available, with the above-described alcohols. Illustrative of the non-ethylenic polycarboxylic acids which may be employed in preparing these poly-(halogenoallyl) esters are the saturated aliphatic polycarboxlic acids such as oxalic, malonic, succinic, adipic, glutaric, pimelic, sebacic, azelaic, suberic, tricarballylic, etc., the cyclic polycarboxylic acids, e. g., the saturated cycloaliphatic polycarboxylic acids such as the cyclopropane dicarboxylic acids, the cyclohexane dicarboxylic acids, the alkyl cycloalkane polycarboxylic acids, etc., and the aromatic polycarboxylic acids such as phthalic, isophthalic, terephthalic, benzoyl phthalic, diphenic and benzophenone —2,4' dicarboxylic acids, etc., the hydroxy saturated polycarboxylic acids, e. g., citric, tartaric, etc., and similar substances.

The poly-(halogenoallyl) esters used in carrying the present invention into effect are, in themselves, relatively inactive polymerizing bodies. If polymerization does occur, the polymers usually are of a low molecular weight, fluid nature and are of limited commercial value. On the other hand, the unsaturated alkyd resins alone are unsuited, even in the presence of polymerization catalysts such as peroxides, for the preparation of practically useful massive bodies. With or without polymerization catalysts, however, they may be applied in film form and, under the influence of heat or light, or heat and light, may be converted in a reasonable time to a cured film. But if effort be made to prepare commercially useful massive bodies from the unsaturated alkyds alone, heat treatment even for 24 hours in the presence of a polymerization catalyst such as super-peroxides usually gives unsuitable materials, that is, they generally lack the properties required for the usual service applications. For example, the cast or molded articles often are soft, rubbery masses (even after heat treatment for 24 hours at elevated temperatures) or, if hard bodies, frequently are filled with bubbles or show cracks, or both, when cured.

It was therefore quite surprising and unexpected to find that by copolymerizing a poly-(halogenoallyl) ester of a non-ethylenic polycarboxylic acid with an unsaturated alkyd resin, interpolymers were obtained having properties quite different from the properties of the individual components when polymerized under the same conditions. The properties of the interpolymers range, for example, from hard, tough, insoluble and infusible bodies both in film form and when cast or molded in large size to softer, flexible bodies. In general, the properties of these new products are such as to render them suitable for a wide variety of technical applications.

Compositions produced in accordance with this invention also are particularly well adapted for use as "solventless varnishes," for instance as coating compositions and binders in the production of laminated sheets and tapes for use in insulating electrical devices, as well as for other applications.

Another practical advantage accruing from my invention is that the poly-(halogenoallyl) esters of non-ethylenic polycarboxylic acids are good dispersion mediums for polymerization catalysts such as super-peroxides, which catalysts are dissolved or dispersed in the unsaturated alkyd resins alone only with great difficulty.

In carrying the present invention into effect a polymerizable esterification product of a polyhydric alcohol and an alpha unsaturated alpha beta polycarboxylic acid is first prepared in accordance with technique now well known to those skilled in the alkyd resin art. Any polyhydric alcohol containing at least two esterifiable aliphatic hydroxyl groups, or mixtures of such alcohols, may be used in preparing the unsaturated alkyd resin. Examples of such polyhydric alcohols are ethylene glycol, di-, tri- and tetra-ethylene glycols, propylene glycol, trimethylene glycol, glycerine, pentaerythritol, etc. Any alpha unsaturated alpha beta polycarboxylic acid, or mixtures of such acids, may be reacted with the polyhydric alcohol or alcohols to form the unsaturated alkyd resin. Examples of such polycarboxylic acids are maleic, monohalomaleic, fumaric, monohalofumaric, citraconic, mesaconic, acetylene dicarboxylic, aconitic, itaconic and its homolgues as, for instance, alpha methyl itaconic acid, alpha ethyl itaconic acid, alpha alpha dimethyl itaconic acid, etc. If available, anhydrides of these polycarboxylic acids may be employed.

The terms "polycarboxylic acid" and "dicarboxylic acid," as used generally herein and in the appended claims with reference to non-ethylenic polycarboxylic acids and alpha unsaturated alphat beta polycarboxylic acids, are intended to include within their meaning the anhydrides of such acids.

In some cases, instead of using an unmodified unsaturated alkyd resin I may use a polymerizable unsaturated alkyd resin which has been internally modified by replacing a part, say up to about 75 mol per cent, of the unsaturated polycarboxylic acid with a non-ethylenic polycarboxylic acid, for example a saturated aliphatic polycarboxylic acid such as succinic, adipic, glutaric, pimelic, sebacic, azelaic, suberic, tricarballylic, etc., a cycloaliphatic or an aromatic polycarboxylic acid, e. g., cyclopropane dicarboxylic, cyclohexane dicarboxylic, phthalic, benzoyl phthalic, terephthalic, isophthalic, benzophenone-2,4' dicarboxylic acid, etc., or with anhydrides of such acids if available.

The term "unsaturated alkyd resin" as used generally herein and in the appended claims is intended to include within its meaning both unmodified esterification products of a polyhydric alcohol with an alpha unsaturated alpha beta polycarboxylic acid and polymerizable esterification products of the said components which have been modified, for example, as above briefly described.

To achieve copolymerization of the unsaturated alkyd resin with the poly-(halogenoallyl) ester, a solution of the said resin in the said ester first preferably is effected. The poly-(halogenoallyl) ester also advantageously may act as the carrier for a small amount of a polymerization catalyst. Examples of polymerization catalysts which may be used are ozone, ozonides, inorganic super-oxides such as barium peroxide, sodium peroxide, etc., aliphatic acyl peroxides, e. g., acetyl peroxide, lauryl peroxide, stearyl peroxide, etc., peroxides of the aromatic acid series, e. g., benzoyl peroxide, various per-compounds such as perborates, persulfates, perchlorates, etc., aluminum salts such as the halides, e. g., aluminum chloride, etc., organic and inorganic acids such as methacrylic acid, hydrofluoric acid, etc., metal compounds of the unsaturated acids as, for instance, cobalt and manganese resinates, linoleates, maleates, etc. Benzoyl peroxide is the preferred catalyst. Any suitable amount of catalyst may be used, but in general the catalyst concentration will be within the range of 0.1 to 2.0 per cent by weight of the whole.

When rapidity of interpolymerization between the poly-(halogenoallyl) ester and the unsaturated alkyd resin is of secondary importance, copolymerization between these components may be effected merely under the influence of heat, light, or heat and light and in the absence of an accelerator of polymerization. The rate of copolymerization and the properties of the final product vary with the time, temperature and, if a catalyst is used, also with the catalyst concentration. Copolymerization may be effected at from room temperature (20° to 30° C.) to temperatures above 100° C., for example about 130° C., but ordinarily I use temperatures within the range of 60° to 120° C. in causing the mixed components to interpolymerize.

In order that those skilled in the art better may understand how the present invention may be carried into effect, the following examples are given by way of illustration. All parts are by weight.

Example 1

| | Parts |
|---|---|
| Diethyl glycol maleate [1] | 90 |
| Di-(1-chloroallyl) succinate | 10 |
| Benzoyl peroxide | 1 |

[1] NOTE.—The diethylene glycol maleate was prepared by esterifying 147 parts maleic anhydride with 160 parts diethylene glycol. The mixed reactants were heated in a nitrogen atmosphere, the temperature being brought to 190° C. in one hour and held at that temperature for about 3 to 5 hours.

The benzoyl peroxide was dissolved in the di-(1-chloroallyl) succinate and the resulting solution was mixed with the diethylene glycol maleate. The mixture was then subjected to heat, specifically a temperature of about 85° to 90° C. In about 10 minutes the solution was converted to a hard, insoluble, infusible composition. Heat treatment for 12 hours at 85° to 90° C. gave no visual indication of further interpolymerization between the components. When a small sample of the mixed components was heated on a 130° C. hot plate, it hardened in less than 45 seconds.

Example 2

| | Parts |
|---|---|
| Diethyl glycol maleate [1] | 80 |
| Di-(2-chloroallyl) succinate | 20 |
| Benzoyl peroxide | 1 |

[1] NOTE.—The diethylene glycol maleate was prepared as described under Example 1.

The mixed components were heated on a 130° C. hot plate, yielding an insoluble and infusible copolymer in less than 60 seconds. The mixed components also are converted into hard, insoluble, infusible copolymers by heating at lower temperatures, e. g. 50° to 100° C. thereby facilitating the control of the interpolymerization reaction and the properties of the end-product.

Fillers such as alpha cellulose, shredded cellulose derivatives, wood flour, asbestos, paper, cloth, etc., may be impregnated with the mixed unpolymerized or partially polymerized components and the mass hardened under heat or under heat and pressure to yield molded articles of good appearance and physical characteristics.

It will be understood, of course, that my invention is not limited to interpolymerization products of diethylene glycol maleate and the di-(1-chloroallyl) and di-(2-chloroallyl) succinates given in the above illustrative examples and that instead of using these particular poly-(halogenoallyl) succinates, I may use a poly-(halogenoallyl) ester of any other non-ethylenic polycarboxylic acid, for example di-(1-halogenoallyl) and di-(2-halogenoallyl), more particularly di-(1-chloro-, 1-bromo-, 1-fluoro- and 1-iodo-allyl) and di-(2-chloro, 2-bromo, 2-fluoro and 2-iodo-allyl), oxalate, malonate, adipate, glutarate, sebacate, azelaate, pimelate, tartrate, phthlate, etc., tri-(1-halogenoallyl) and tri-(2-halogenoallyl) citrate, tri-carballylate, etc. Where lightness of color of the copolymer is desirable, the iodo derivatives should be avoided. I prefer to use the chloro derivatives. Instead of using diethylene glycol maleate, I may use any other polymerizable unsaturated alkyd resin, for example, glyceryl itaconate, glyceryl maleate, ethylene glycol maleate, ethylene glycol itaconate, esterification products of ethylene glycol, itaconic acid and phthalic anhydride, of glycerine, itaconic acid and phthalic anhydride, of diethylene glycol, itaconic acid and succinic acid, of ethylene glycol, maleic anhydride and succinic acid, of diethylene glycol, maleic anhydride and itaconic acid, of diethylene glycol, maleic anhydride and phthalic anhydride, of glycerine, maleic anhydride and phthalic anhydride, etc. Such modified and unmodified unsaturated alkyd resins are described more fully in my copending application Serial No. 302,172, filed concurrently herewith and assigned to the same assignee as the present invention.

Also, polymerization catalysts other than benzoyl peroxide may be employed, for instance accelerators of polymerization such as hereinbefore mentioned.

In certain cases, instead of copolymerizing a single poly-(halogenoallyl) ester of a non-ethylenic polycarboxylic acid with a single unsaturated alkyd resin, I may copolymerize a plurality of such esters either with a single unsaturated alkyd resin or with a plurality of such resins. In this way it is possible to obtain a composition comprising a mixture of interpolymers best adapted to meet a particular service application.

Although in the foregoing examples I have shown interpolymerization products of a minor proportion (10 to 20 per cent by weight of the mixed components) of a poly-(halogenoallyl) ester with a major proportion of an unsaturated alkyd resin, it will be understood, of course, that the invention is not limited to these particular proportions. Mainly for economic reasons I prefer that the poly-(halogenoallyl) ester does not exceed substantially 50 per cent by weight of the mixed materials, but the use of higher amounts is not precluded, as for example up to, say, 60 or 65 per cent by weight of the whole. The incorporation of a small amount, e. g., 1 or 2 per cent, of a poly-(halogenoallyl) ester of a non-ethylenic polycarboxylic acid has a beneficial effect upon such alkyd resins, yielding products of improved properties as compared with unsaturated alkyd resins which have been polymerized in the absence of such poly-(halogenoallyl) esters. However, somewhat better results are obtained when the said ester constitutes at least 5 per cent of the mixed starting components. In general, the proportions will be varied depending upon the particular properties desired in the interpolymer.

The interpolymerization products of this invention have a wide range of properties. Depending, for example, upon the particular poly-(halogenoallyl) ester and the particular unsaturated alkyd resin employed, the particular proportions thereof, the particular conditions of polymerization and the extent of the interpolymerization, they vary from soft, flexible, soluble bodies to hard, rigid masses of varying resistance to solvents. In intermediate stages of copolymerization some form fluid compositions of varying intrinsic viscosities and may be so used. For coating and impregnating applications where the presence of a small amount of solvent in the cured composition is not objectionable, the mixed starting components may be diluted with volatile or non-volatile solvents to viscosities best adapted to meet the particular service application, and then may be copolymerized after application of the solution to the particular article to be coated or impregnated. By suitable selection of the starting materials and the conditions of interpolymerization, interpolymers can be obtained in an insoluble, infusible state practically resistant to the destructive effect of other chemical bodies such as acids, bases, solvents and the like.

These new interpolymers may be used alone or with fillers or other modifying agents, for example in casting, molding and laminating applications, as adhesives, impregnants and surface coating materials. They may be used as impregnants for many porous bodies, such as cork, pottery, felts or fabricated bodies with interstices, e. g., the windings of electrical coils, netted fiber, interwoven fibrous materials, etc. They also may be used for protectively coating impervious articles such as metals, or for coating or coating and impregnating articles such as paper, wood, cloth, glass fibers, concrete, synthetic boards, etc. They also may be employed in the production of wire enamels and winding tapes. The mixed components or partial interpolymers thereof, with or without modifying agents, may be cast and molded under heat or under heat and pressure. They also may be molded by injection, extrusion or compression molding technique whereby they are heat- and pressure-hardened to yield molded articles of manufacture for various industrial, household and novelty uses.

What I claim as new and desire to secure by Letters Patent of the United States is:

1. A polymerizable composition comprising (1) a polymerizable unsaturated alkyd resin, (2) a poly-(halogenoallyl) ester selected from the class consisting of poly-(1-halogenoallyl) and poly-(2-halogenoallyl) esters of a polycarboxylic acid selected from the class consisting of saturated aliphatic polycarboxylic acids and aromatic polycarboxylic acids, said poly-(halogenoallyl) ester constituting from 1 to 65 per cent by weight of the mixed components of (1) and (2), and (3) a catalyst for accelerating the copolymerization of the said mixed components.

2. The polymerized composition of claim 1.

3. A product comprising an interpolymer of (1) a polymerizable unsaturated alkyd resin and (2) a succinic di-ester of 2-chloroallyl alcohol in an amount corresponding to from 5 to 50 per cent by weight of the mixed components of (1) and (2).

4. A product comprising an interpolymer of (1) a polymerizable unsaturated alkyd resin and (2) an adipic di-ester of 2-chloroallyl alcohol in an amount corresponding to from 5 to 50 per cent by weight of the mixed components of (1) and (2).

5. A product comprising an interpolymer of (1) a polymerizable unsaturated alkyd resin and (2) a phthalic di-ester of 2-chloroallyl alcohol in an amount corresponding to from 5 to 50 per cent by weight of the mixed components of (1) and (2).

6. A composition comprising the product of polymerization of a mixture including (1) a polymerizable unsaturated alkyd resin obtained by reaction of a mass comprising essentially a polyhydric alcohol and an alpha unsaturated alpha beta polycarboxylic acid and (2) a poly-(2-chloroallyl) ester of an aromatic polycarboxylic acid, said poly-(2-chloroallyl) ester constituting from 5 to 50 per cent by weight of the mixed components of (1) and (2).

7. A composition containing the product of polymerization of a mixture of copolymerizable materials comprising (1) a polymerizable esterification product of a polyhydric alcohol, an alpha unsaturated alpha beta polycarboxylic acid and a polycarboxylic acid selected from the class consisting of saturated aliphatic polycarboxylic acids and aromatic polycarboxylic acids and (2) a poly-(halogenoallyl) ester selected from the class consisting of poly-(1-halogenoallyl) and poly-(2-halogenoallyl) esters of a polycarboxylic acid selected from the class consisting of saturated aliphatic polycarboxylic acids and aromatic polycarboxylic acids, said poly-(halogenoallyl) ester constituting from 1 to 65 per cent by weight of the mixed components of (1) and (2).

8. A product comprising an interpolymer of (1) a polymerizable maleic ester of a polyhydric alcohol and (2) a poly-(halogenoallyl) ester selected from the class consisting of poly-(1-halogenoallyl) and poly-(2-halogenoallyl) esters of a polycarboxylic acid selected from the class consisting of saturated aliphatic polycarboxylic acids and aromatic polycarboxylic acids, said polyhalogenoallyl) ester constituting from 5 to 50 per cent by weight of the mixed components of (1) and (2).

9. A product comprising an interpolymer of (1) a polymerizable itaconic ester of a polyhydric alcohol and (2) a poly-(halogenoallyl) ester selected from the class consisting of poly-(1-halogenoallyl) and poly-(2-halogenoallyl) esters of a polycarboxylic acid selected from the class consisting of saturated aliphatic polycarboxylic acids and aromatic polycarboxylic acids, said poly-(halogenoallyl) ester constituting from 5 to 50 per cent by weight of the mixed components of (1) and (2).

10. A product comprising an interpolymer of (1) a polymerizable fumaric ester of a polyhydric alcohol and (2) a poly-(halogenoallyl) ester selected from the class consisting of poly-(1-halogenoallyl) and poly-(2-halogenoallyl) esters of a polycarboxylic acid selected from the class consisting of saturated aliphatic polycarboxylic acids and aromatic polycarboxylic acids, said poly-(halogenoallyl) ester constituting from 5 to 50 per cent by weight of the mixed components of (1) and (2).

11. A resinous composition comprising the product of polymerization of a mixture comprising (1) a polymerizable unsaturated alkyd resin obtained by reaction of a mass comprising essentially a polyhydric alcohol and an alpha unsaturated alpha beta polycarboxylic acid and (2) a poly-(2-halogenoallyl) ester of a saturated aliphatic polycarboxylic acid, said poly-(2-halogenoallyl) ester constituting from 5 to 50 per cent by weight of the mixed components of (1) and (2).

12. A resinous composition comprising the product of polymerization of a mixture comprising (1) a polymerizable unsaturated alkyd resin obtained by reaction of a mass comprising essentially a polyhydric alcohol and an alpha unsaturated alpha beta polycarboxylic acid and (2) a poly-(2-halogenoallyl) ester of an aromatic polycarboxylic acid, said poly-(2-halogenoallyl) ester constituting from 5 to 50 per cent by weight of the mixed components of (1) and (2).

13. The method of producing new synthetic compositions which comprises (1) forming a polymerizable composition comprising (a) a polymerizable unsaturated alkyd resin, (b) a poly-(halogenoallyl) ester selected from the class consisting of poly-(1-halogenoallyl) and poly-(2-halogenoallyl) esters of a polycarboxylic acid selected from the class consisting of saturated aliphatic polycarboxylic acids and aromatic polycarboxylic acids, said poly-(halogenoallyl) ester constituting from 1 to 65 per cent by weight of the mixed components of (a) and (b), and (c) a catalyst for accelerating the copolymerization of the said mixed components, and (2) polymerizing the said polymerizable composition to form an interpolymer of the said unsaturated alkyd resin and poly-(halogenoallyl) ester.

14. A composition containing the product of polymerization of a mixture comprising (1) a polymerizable unsaturated alkyd resin obtained by reaction of ingredients comprising a dihydric alcohol and an alpha unsaturated alpha beta dicarboxylic acid and (2) a poly-(halogenoallyl) ester selected from the class consisting of poly-(1-halogenoallyl) and poly-(2-halogenoallyl) esters of a polycarboxylic acid selected from the class consisting of saturated aliphatic polycarboxylic acids and aromatic polycarboxylic acids, said poly-(halogenoallyl) ester constituting from 1 to 65 per cent by weight of the mixed components of (1) and (2).

15. As a new product, an interpolymer resulting from the polymerization of a mixture of (1) a polymerizable maleic ester of a polyhydric alcohol and (2) a phthalic di-ester of 2-chloroallyl alcohol, said di-ester constituting from 5 to 50 per cent by weight of the mixed components of (1) and (2).

GAETANO F. D'ALELIO.

CERTIFICATE OF CORRECTION.

Patent No. 2,319,798. May 25, 1943.

GAETANO F. D'ALELIO.

It is hereby certified that error appears in the printed specification of the above numbered patent requiring correction as follows: Page 1, first column, line 40, strike out the formula and insert instead the following -

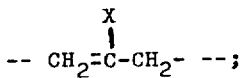

$$-- CH_2=\overset{\overset{X}{|}}{C}-CH_2- --;$$

page 2, first column, line 39, for "alphat" read --alpha--; and second column, lines 38 and 62, Examples 1 and 2 respectively, for "Diethyl" read --Diethylene--; page 3, first column, line 19, for "di-(2-chloro, 2-bromo, 2-fluoro" read --di-(2-chloro-, 2-bromo-, 2-fluoro- --; line 23, for "tri-carballylate" read --tricarballylate--; page 4, first column, line 49, before "halogenoallyl" insert an opening parenthesis; and that the said Letters Patent should be read with this correction therein that the same may conform to the record of the case in the Patent Office.

Signed and sealed this 20th day of July, A. D. 1943.

Henry Van Arsdale, (Seal)                      Acting Commissioner of Patents.